March 12, 1963 W. T. DAYTON 3,080,638
MANUFACTURE OF GUIDE HOLDERS
Filed July 24, 1957 3 Sheets-Sheet 1
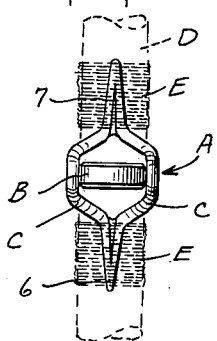
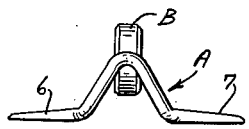
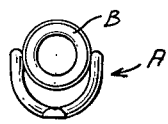
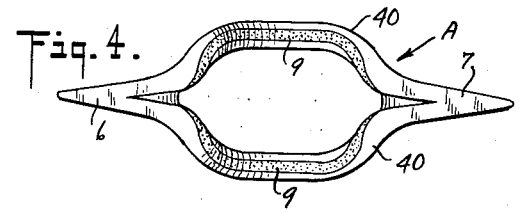
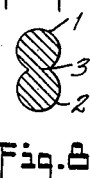
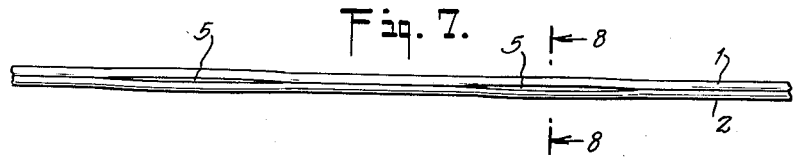
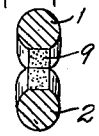
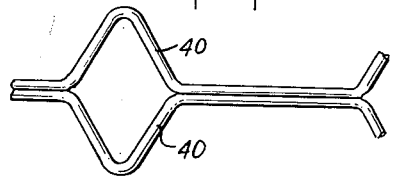
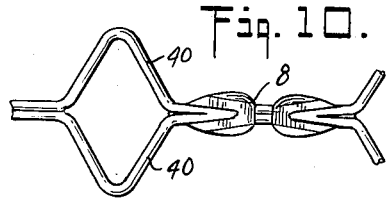
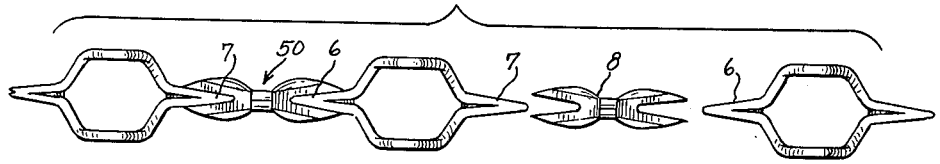
INVENTOR.
WILBUR T. DAYTON
BY
ATTORNEYS

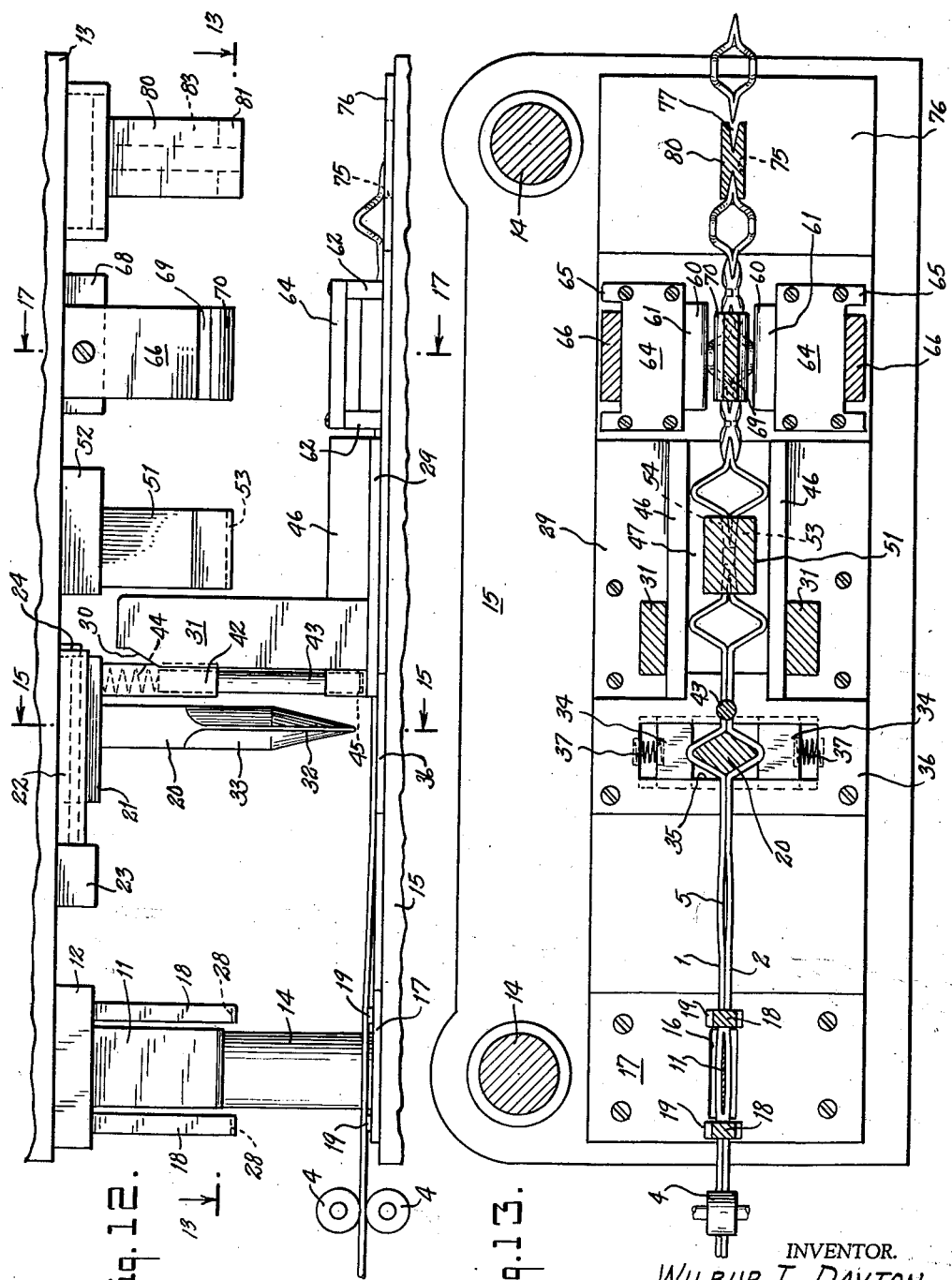

March 12, 1963  W. T. DAYTON  3,080,638
MANUFACTURE OF GUIDE HOLDERS
Filed July 24, 1957  3 Sheets-Sheet 3
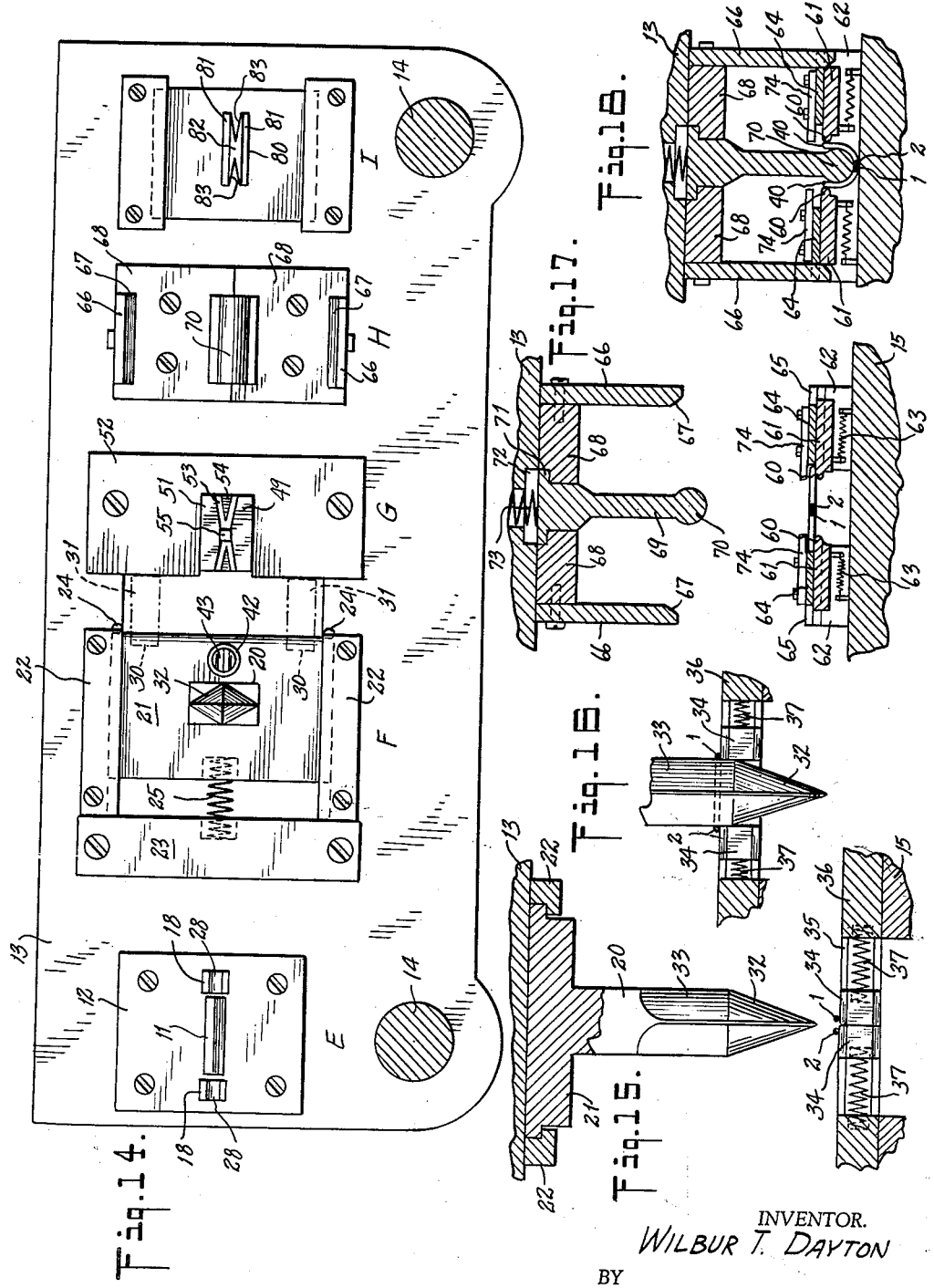
INVENTOR.
WILBUR T. DAYTON
BY
Corey, Hart & Stemple
ATTORNEYS United States Patent Office 3,080,638
Patented Mar. 12, 1963

3,080,638
MANUFACTURE OF GUIDE HOLDERS
Wilbur T. Dayton, New Britain, Conn., assignor, by mesne assignments, to W. W. Mildrum Jewel Company, East Berlin, Conn., a corporation of Connecticut
Filed July 24, 1957, Ser. No. 673,871
7 Claims. (Cl. 29—33)

This invention relates to line guides for fishing poles and relates more particularly to the manufacture of an improved holder therefor.

Line guides of the type with which this invention is concerned comprise a small, ring-shaped guide member disposed between and firmly secured, as by soldering, to a pair of spaced, upstanding arms which engage the ring at diametrically opposite points. These supporting arms form part of the holder which usually also includes a pair of aligned, longitudinally-extending, end prongs designed to be lashed to a fishing pole by wrappings of silk thread, fine wire and the like. A line guide of this general construction is shown in U.S. Letters Patent No. 2,146,964, dated February 14, 1939, which is concerned with the method of making the holder for the same. According to the method of this patent, a section of flat wire of rectangular cross section and of appropriate length to form a single guide holder, is slit longitudinally by an incision located midway between the longitudinal edges of the rectangular wire and equally spaced from the ends of such section. The slit portions of the wire are then spread apart to produce two oppositely directed V-shaped bights which are then subjected to a stamping operation to eliminate the sharp edges formed in the slitting and spreading operations and to reduce them to an approximately circular cross section. During this stamping operation, the ends of the wire section are given a tapered form. As the shaping of the ends results in the formation of fins on such ends, the next step in the disclosed method is to trim off these fins by grinding or cutting. The bights are then bent to a form suitable for the application of the guide ring thereto. The final step in the method of the patent is to subject the holder to a tumbling operation to finish and polish the surfaces thereof. While this mode of procedure possessed advantages over methods of manufacturing such guide holders theretofore practiced by the art, it had certain inherent disadvantages which made its practice not wholly satisfactory.

It is a primary purpose of the present invention to provide an improved method of manufacture which shall enable guide holders of the indicated type to be made progressively in a single operation which has fewer steps than required by previous known methods.

Another object of the invention is to so improve the method of manufacturing such guide holders that identical holders may be made with a minimum of handling and at less expense than by previous methods.

Other objects of the invention, as well as the advantages and novel features thereof, will become apparent from a perusal of the following description, when read in connection with the accompanying drawings, in which FIG. 1 is a top plan view of a holder embodying the invention and with its associated guide, the complete unit being shown as it appears when attached to a fishing pole, a horizontally disposed portion of which is indicated in broken lines;

FIG. 2 is a side elevational view of the holder and guide unit shown in FIG. 1;

FIG. 3 is an end elevation of the unit shown in FIG. 2;

FIG. 4 is a bottom plan view of a holder per se on an enlarged scale;

FIG. 5 is a top plan view of a portion of the wire from which the holder of this invention is made;

FIG. 6 is a vertical sectional view of the wire taken along the line 6—6 of FIG. 5;

FIG. 7 is a view similar to FIG. 5 and illustrates the manner in which spaced, successive incisions are made in the wire;

FIG. 8 is a vertical sectional view taken along the line 8—8 of FIG. 7;

FIG. 9 is a plan view of a wire portion showing the manner in which the split parts of the wire are spread apart;

FIG. 10 is a view similar to FIG. 9 and shows the result of a swedging operation to the portion of the wire between spread parts thereof, such swedging operation constituting an initial step in the formation of the tapered ends of adjoining holders;

FIG. 11 is an exploded top plan view showing from the left thereof, a holder in which the spread parts have been bent to final form, a finished holder ready to be severed from the wire, the portion that is cut out of the wire in the severing operation, and the finished holder that is cut from the wire;

FIG. 12 is a front elevational view of the tools which perform the successive operations on the wire to convert it into completed holders;

FIG. 13 is a horizontal sectional view taken along the line 13—13 of FIG. 12, the spreading punch being shown advanced and the guide plates of the bending mechanism on the die plate being omitted for the sake of clearness;

FIG. 14 is a bottom plan view of the die block upon which are mounted the forming tools and showing the cams provided on the die bed in dotted outline;

FIG. 15 is a vertical, partially sectional view of the spreading mechanism taken along the line 15—15 of FIG. 12, the view showing the relation of the parts prior to advancement of the spreading tool to spread the split parts of the wire in the region of an incision;

FIG. 16 is a fragmentary view of the parts illustrated in FIG. 15, and shows the relation of the parts cooperating in the spreading operation when the spreading tool has reached the end of its forward stroke;

FIG. 17 is a vertical sectional view of the mechanism for bending the spread parts of the wire, the view being taken along the line 17—17 of FIG. 12 and showing the relation of the parts prior to the bending operation; and FIG. 18 is a view similar to FIG. 17, but showing the relation of the parts of the bending mechanism at the end of the bending operation.

Referring to FIGS. 1 to 3 of the drawings, the reference letter A indicates generally a guide holder manufactured in accordance with the present invention. The guide holder is composed of two centrally located V-shaped members C, C which support at their apexes a line guide B of annular shape. The ring B may be made of any suitable material or materials providing a smooth, wear-resistant surface for the fishing line to be guided thereby. The ring B is secured at diametrically opposite points to the members C, C of the holder in any suitable manner and so that the axis of the ring is substantially parallel to the length of the aligned prongs 6, 7 forming the ends of the holder. The holder A is mounted on a fishing pole D in the manner indicated in FIG. 1 of the drawings and is secured thereto by wrappings E, E of silk thread, fine wire or the like, as is customary in the art.

The holder A is made from a single section of a wire which has been drawn or rolled so that it consists of two longitudinally extending beads 1, 2 integrally connected along their inner longitudinal edges, as shown in FIGS. 5 and 6 of the drawings. The beads 1, 2 each have a substantially circular cross sectional area and have smoothly rounded exterior surfaces. The two beads are connected together throughout their length by an area of juncture 3 contained in a chord plane common to both beads and having an angular width of approximately 30°, so that approximately 330° of the periphery of each bead is free and rounded and without any corners or sharp edges. The wire is provided in lengths of indefinite extent, for example, in the form of a coil suitable to be delivered to a machine for performing the hereinafter described operations in the manufacture of the guide holders.

In accordance with the present invention, the first step in the process is to feed the wire forwardly by pressure rollers 4, 4 to a set of coacting tools capable of providing a series of spaced incisions 5 in the wire between the beads 1, 2 (note FIGS. 7 and 8). The slitting operation is performed by a shearing punch 11 which as is shown more clearly in FIGS. 12 to 14 of the drawings, is supported in depending relation by a plate 12 secured as by bolts to a die block 13. The die block is substantially rectangularly shaped and the wire, in being subjected to the hereinafter described processing operations, passes therebeneath along a path of feed substantially vertically below and parallel with the longitudinal central line of such block. The rollers 4, 4 are located adjacent to the entry end of the die block 13 and the plate 12 is connected to the entry end of such block. The die block is slidably mounted on a pair of rods 14, 14 which extend vertically upwardly from a die bed 15 having a rectangular shape substantially similar to that of block 13. The rods 14, 14 are located at the entry and delivery ends of the die bed 15 adjacent to the rear longitudinal edge of such bed and project through suitable guide openings provided in the rear edge of die block 13 at the entry and delivery ends of the latter. Means (not shown) are provided to reciprocate die block 13 vertically on the guide rods 14, 14 in a manner well known in the art. The shearing punch 11 in its operations coacts with and moves into an elongated, rectangularly-shaped die opening 16 provided in a plate 17 secured in position on the entry end of the die bed 15. It will be noted in the drawings that the punch 11 and die opening 16 extend lengthwise of the block 13 and bed 15. Positioned adjacent to the ends of the shearing punch 11 and supported in depending relation from the plate 12 are a pair of spring pressed holding members 18, 18 which, when the punch descends, engage the portions of the wire adjacent to the ends of the part thereof that is sheared by the punch 11. The bottom working ends of the members 18, 18 are provided with suitably shaped seats 28, 28 to receive such wire portions and coact with pads 19, 19 provided on plate 17 to hold such wire portions firmly during the shearing operation.

The feeding rollers 4, 4 will feed the wire forwardly intermittently at a rate of feed such that during the cycling of the machine, the incisions 5 made by the shearing punch 11 in the wire will be equally spaced apart a distance such as will enable the formation of the end portions 6, 7 of the holders and the trim part 8 in FIG. 11 intermediate opposed end portions 6, 7 of adjacently formed holders. In the region of each incision 5 the area of juncture 3 between the beads 1, 2 will be severed, leaving with each of the beads in such region a cut edge 9 as shown in FIG. 8. These cut edges of the separated wire portions in each incision are opposed to each other and are in spaced relation throughout the length of the incision (compare FIGS. 7 and 8).

Following each severance of the wire at the shearing station, the wire is advanced lengthwise one step by the rollers 4, 4 to bring such severed wire part to a position between the shearing station and a station at which the separated bead portions of such severed part are spread away from each other to produce two oppositely directed V-shaped members whose ends are integrally united to the unslitted parts of the wire. On the second succeeding advancing step of the wire, such severed wire part is moved into operative position beneath a punch 20 at such spreading station. The punch 20 depends from a plate 21 which is slidably supported by a pair of longitudinally extending parallelly arranged guides 22 secured in any suitable fashion to the die block 13. The plate 21 is normally urged forwardly by a spring 25 to normally maintain one end of such plate in engagement with a pair of stops 24, 24 provided in the die block 13 adjacent to the forward ends of the guides 22. As shown more clearly in FIG. 14 of the drawings, the spring 25 is seated at one end in a recess provided in the other end of plate 21 and such spring is seated at its other end in an opposing recess provided in a cross bar 23 secured to the die block 13 adjacent to the starting ends of the guides 22. The plate 21 is pushed backwardly from its forward normal position against the tension of spring 25 during the advancing downward movement of the die block 13 through cam surfaces 30 provided on the upper portions of a pair of spaced rectangularly-shaped upright members 31 (note FIG. 12). The bases of members 31 stand on the die bed 15 and are secured in position thereon by a plate 29 suitably bolted to the die bed. The members 31 project upwardly through openings in such plate 29 positioned adjacent to and exteriorly of the entry ends of a pair of spaced, longitudinally extending guides 46 provided on such plate. The cam surfaces 30 are located slightly below the upper ends of the members 31, being disposed in opposed relation to the direction of feed of the wire and inclining forwardly and upwardly towards the tops of these members. During the advancing downward movement of the die block 13, the upper ends of the members 31 enter into an opening in such die block thereby enabling the cam surfaces 30 to come into engagement with the leading edge of plate 21 and force it back in a direction opposed to the direction of feed of the wire. The punch 20 supported by plate 21 will thus be moved longitudinally in a direction opposite to the feed of the wire as it is being advanced to spread the separated wire portions in FIG. 7 by an advancing, drawing action into the form shown in FIG. 9. This drawing action of the punch enables the obtaining of a uniform spread of the wire portions operated upon.

As will be observed more clearly in FIGS. 12 and 15 of the drawings, the working end of the spreading punch 20 has a bayonet shape. The four triangular surfaces which form the pyramidically-shaped lower end 32 of the punch 20 extend upwardly to provide the lower end 33 of the shank thereof with a four sided shape that, as shown in FIG. 13, is substantially diamond-like in cross section and the major transverse axis thereof is disposed at right angles to the direction of feed of the wire. Located below the spreading punch 20 and coacting therewith, are a pair of slides 34, 34 which are mounted for sliding movement in directions at right angles to the feed of the wire in an elongated, rectangularly-shaped opening 35 provided in a plate 36 secured to the die bed 15. The slides 34, 34 are normally biased towards the longitudinal center line of the die bed and into engagement with each other at the central portion of the opening 35 by springs 37 which extend lengthwise of the opening and are located between the slides 34 and the ends of such opening. The ends of the springs 37 are suitably seated in recesses provided in the guides 34 and in the end walls of opening 35. Also associated with the punch 20 is a spring pressed holding plunger 43. The upper end of plunger 43 is slidably received in a tubular housing 42 which is located in advanced, aligned relation with punch 20 and is supported in depending relation by plate 21. Thus the lower working end of the holding plunger 43 is positioned so that it is enabled to engage the wire adjacently in advance of the slide opening 35 and to hold the same against the plate 36 as the plunger 20 passes downwardly between the slides 34. A spring 44 in the housing 42 normally maintains plunger 43 in an advanced position and yieldably resists retraction of such plunger within the housing 42. The lower end of plunger 43 is provided with a seat 45 to receive the wire, the configuration of such seat being substantially similar to the configuration of the upper portions of the beads 1, 2 of the wire between the incisions 5 in the wire.

It will be understood from the foregoing description of the parts at the spreading station, that during a period of dwell of the feed of the wire by the pressure rollers 4,4, the die block 13 will be lowered to bring plunger 43 initially into engagement with that unsevered part of the wire which is in a leading position with respect to the severed part of the wire that has been moved into position over the abutting ends of the slides 34, 34 in the last advancing movement of the wire. During the downward movement of die block 13, the plunger will be forced into the housing 42 thereby compressing spring 44 which will cause the plunger to hold the wire against plate 36 with progressively increasing pressure. As the die block 13 continues its downward movement, the lower end 32 of punch 20 enters into the incision 5 of the severed part of the wire overlying the sides 34, 34 and between the abutting ends of such slides, causing the slides to be retracted against the tension of their associated springs 37 (compare FIGS. 15, 13 and 16, respectively). During the passage of the punch end 32 through the incision 5, the camming surfaces 30 on the members 31 will come into engagement with the leading edge of plate 21 and force the plate in a direction longitudinally of the die block and opposite to the direction of feed of the wire, thereby causing the punch 20 which is carried by such plate, to move likewise within the incision 5. There is consequently a drawing back of the wire as it is being spread by the working end 32 of the punch. It has been found that this method of spreading the wire is essential to the accomplishment of a uniform spreading of the separated bead portions of such severed part of the wire and at the same time eliminates the possibility of cracking the frame that is being formed by such bead portions during the spreading operation. Since the plunger 43 is also carried by the plate 21 it will move longitudinally of the machine with the punch 20 and in so doing ride on the unsevered wire portion with which it is engaged towards the wire part being spread. As the punch 20 continues its downward movement, the slides 34, 34 will cause the formed wire frame to ride up on the lower shank portion 33 of the punch until the advancing movement of the punch has been completed. During this last portion of the advancing movement of the punch, the cam surfaces 30 will no longer be forcing the plate 21 towards the shearing station, so that the only movement that is being imparted to the punch is the vertical descending movement of the die block 13.

As a result of the above described spreading operation, the two portions of the beads in the severed part of the wire that is so worked, will be spread away from each other and formed into two oppositely directed V-shaped members which are located in a plane containing adjacent unsevered portions of the wire and which have the form of the members designated 40, 40 in FIG. 9 of the drawings. The formation of these particular members 40, 40 is the only operation performed at this time by the machine, because the working end of the punch 20 is in advance of the working ends of the other wire forming members carried by the die block 13, as will be readily apparent from FIG. 12 of the drawings. Following the completion of this spreading action, with the spreading punch 20 threaded through the wire and with the wire at rest, the operations to be performed by said other wire forming members are performed while the die block 13 continues its downward movement. Thus, during such continued downward movement of the die block, the shearing punch 11 makes a new incision in a following portion of the wire and those tools which are in advance of the punch 20 perform their separate operations on advanced portions of the wire. As to the latter operations, these will be described in order as the wire part we have above discussed is advanced in a step-by-step fashion through the machine. In the next feeding step of the wire by the rollers 4, 4, the unsevered wire part in advance of such partially formed holder is brought to a pressing station beneath a swedging die for simultaneous formation of the following and leading ends of adjacent holders connected by such unsevered wire part. In the advancement of such unsevered wire part into operative position beneath the swedging die, such partially formed holder or frame enters between a pair of vertical guide plates 46 which are formed on the plate 29 and which extend in parallelism with the longitudinal center line of the machine from points adjacent to the frame spreading station, to and past the pressing station, to points adjacent to a frame bending station (note FIGS. 12 and 13). The guide plates 46 function to guide the wire during its advancing feeding movement and while it is being retracted in the above described drawing operation. The plates 46, through the two partially formed frames located therebetween in each operation of the machine, also holds the unsevered wire part between such partially formed frames in proper position with relation to the swedging tool during the latter's pressing operation. As is shown more clearly in FIG. 14 of the drawings, the swedging die is formed on the lower end of a block 51 depending from a plate 52 which is suitably secured to the die block 13. The plate 52 is so arranged on the die block 13 that the transverse edge portions thereof separated by block 51 and opposed to the advanced surfaces of the uprights 31, 31 will slidably engage such surfaces and support the uprights during their engagement with the punch slide 21. In the swedging operation, the working end of block 51 enters between the guides 46, 46 adjacently in advance of the uprights 31, 31 and presses the said unsevered wire part connecting such partially formed frames against the plate surface 47 located between the guides 46, 46 to shape the holder ends. The swedging die includes on its working end a substantially X-shaped die portion 53 having a central portion 55 recessed out so that the portion 50 in FIG. 11 of the wire entering such recess is not substantially deformed. Between the legs of the die portion 53 are formed two longitudinally aligned, triangularly-shaped recesses 54 of tapered curved configuration such that when the die is pressed upon said unsevered wire part the ends of the latter will be shaped into the proper configuration for the end portions of the adjoining holders. During this pressing operation the metal of said unsevered wire part will be cold worked against the plate surface 47 so that the two ends 6, 7 being formed will taper in thickness from their associated holders, and each will have on its lower side a substantially flat rear surface, and on its upper side a substantially cone-like surface portion that will be the facing surface of such end. The remaining portion of said unsevered wire part will be formed into the configuration of the trimmed off piece 8 shown in FIG. 11 of the drawings.

The next step to be performed on the holder whose formation we have been following consists in bending up the side frame members 40, 40 thereof so that the narrower mid portions or apexes of such members are disposed substantially in parallel relation and at right angles to the top surface of the die bed 15. This operation is performed on said holder after it has advanced two steps from its position during the above described pressing operation and after the above described unsevered wire part worked on at the pressing station has moved to a position adjacently in advance of the station at which such bending operation takes place. This bending operation is accomplished by the coaction of a forming punch 70 with the opposed forming edges 60, 60 of a pair of slides 61, 61 mounted for sliding movement toward and away from each other in a direction at right angles to the direction of the feed of the wire. As shown in FIGS. 13, 17 and 18 of the drawings, each slide 61 is slidably mounted on a pair of side supports 62 and is normally maintained in a retracted position on such supports by a spring 63, which is connected at one end to a post depending from its associated slide 61 and is connected at its other end to an upright post provided on the die bed 15 beneath its associated slide 61. Each slide is maintained in position on its guides 62 by a cover plate 64 that is so arranged on the latter and sufficiently narrow in width to leave exposed both the forward edge 60 of such slide and the rear edge thereof, in the normal retracted position of said slide. Each plate 64 has two rearwardly extending projections 65 between which projects the aforesaid rear edge of the associated slide. The projecting rear edges of the slides 61 are engageable by depending members 66 connected to blocks 68 secured to the die block 13 above the slides. The members 66 are provided at their lower ends with opposed, inclined camming surfaces 67, 67 which during the downward movement of the members 66, engage the rear edges of the slides 61, 61 and move the slides toward each other against the tension of their associated springs 63, 63. Located centrally with respect to the depending members 66 and secured between the blocks 68, 68 is a depending plate 69 carrying the forming punch 70. The upper end 71 of plate 69 in FIG. 17 is enlarged and located for vertical slidable movement in a chamber 72 formed by the blocks 68 and the die block 13. The plate 69 is normally biased to an advanced position in the chamber 72 by a spring 73. The punch 70 carried by plate 69 is located below the lower ends of the slide actuating members 66 so that it comes into engagement with a partially formed holder resting on the front edges of slides 61 before the members 66 come into engagement with the rear edges of such slides.

It will be understood from the foregoing description of the apparatus at the bending station, that the holder whose formation we are following, will be moved into position at such station on the front edges 60 of the spaced slides 61 while the slides are in retracted positions. The holder passes between the cover plates 64 which function as side guides during such feed of said holder, and under the projecting opposed edge portions of guide plates 74, 74. The plates 74 are secured upon the plates 64 and maintain the holder in proper relation to the slides 61. In the next period of dwell in the wire feed, the forming punch 70 will descend and press the ends 6, 7 of the holder and the connected root portions of the members 40 of such holder downwardly between the slides 61, 61. The initial engagement of the punch 70 with the holder will be cushioned by the spring 73 associated therewith. As the punch 70 continues its movement, the narrow mid portions of the holder members 40, 40 are drawn downwardly over the rounded front edges 60 of the slides 61 thereby bending such members about the forming punch 70. Prior to the end of the advancing movement of the punch 70, the cam surfaces 67 of the members 66 will come into engagement with the rear edges of the slides 61 and cause such slides to be moved towards each other against the tension of their springs 63. As a result of this downward movement of the forming punch 70 and the inward movement of the slides 61, the narrow mid portions of the members 40, 40 are bent toward each other into a substantially parallel relation in which they are disposed at right angles to the upper surface of the die bed 15 (compare FIGS. 17 and 18). This bending action further causes the cut edges 9 provided on such members in the shearing operation to be changed from the wholly opposed relation shown in FIGS. 7 and 8, to a relation in which the central portions of such cut edges 9 on the narrow mid portions of such members will be turned inwardly and downwardly to be disposed in opposed relation to the upper surface of the die bed 15. Thus the central portions of the cut edges 9, 9 on the members 40, 40 will be turned to the rear of the holder, while the end portions of such cut edges on the root portions of such members 40, 40 will remain in substantially the same opposed relation in which they were formed during the shearing operation, as is shown in FIG. 4 of the drawings. With this configuration of the cut edges 9, a fishing line traveling through a line guide B mounted on the finished holder can not come into engagement with such ragged edges, but will engage only the smooth rounded surfaces of the original wire.

After the above described bending operation, said holder is moved forwardly one step in FIG. 13 to a position to locate the unsevered wire part connected to the advancing end thereof in the field of action of mechanism for cutting out the part 8 in FIG. 11 of such wire part to separate the leading finished holder from the wire and thereby place said holder at the leading or advancing end of the wire. As shown in FIGS. 12 to 14 of the drawings, this mechanism includes a trimming die plate 76 secured upon die bed 15 and provided with an elongated, substantially rectangularly-shaped opening 75 extending longitudinally of the machine and located in the path of travel of the wire. The opening 75 is provided at its ends with triangularly-shaped, inwardly directed members 77 whose apexes are disposed in opposed relation and which have peripheral configurations conforming to the outlines of the connected ends 6, 7 of adjacent holders. Coacting with the die opening 75 is a trimming punch 80 having two substantially rectangularly-shaped working end portions 81 disposed in spaced parallel relation and separated by a centrally located recessed die portion 82. The die portion 82 is provided at its ends with triangularly-shaped slots 83 which extend lengthwise of the punch 80 and which have a cross sectional area substantially similar to the cross sectional area of the members 77. The overall cross sectional configuration of the portions 81, 82 of the punch substantially conform to the shape of the opening in die plate 76. Accordingly, it will be understood that when the central portion of said unsevered wire part is properly positioned with relation to the die opening 75 so that the connected ends 6, 7 of such wire part rest on the extensions 77 and the trimming punch 80 descends, the part designated 8 in FIG. 10 will be cut away from said wire part, severing the completed holder at the leading end of the wire, and simultaneously completing the leading end of the succeeding holder which now becomes the leading end of the wire. Due to the formation of the working end of the punch 80, this severing action takes place after the rectangularly-shaped portions 81 of the punch have already entered the die opening 75 so that during such action the punch is being guided by the die opening to make a true cut leaving the end portions 6, 7 of the holders with the exact configuration desired.

It is believed that the above description gives an adequate understanding of the operation of the machine, it being considered only necessary to point out in summary that all of the above described operations take place on different parts of the wire during each period of dwell in the feed of the wire. As has been previously mentioned, during the initial portion of the downward movement of the die block 13, the spreading operation is the only operation that is performed. After the spreading punch has completed its operation and is threaded through the wire part spread thereby, the remaining tools come into operation to perform their functions substantially simultaneously.

While I have hereinabove illustrated and described a preferred embodiment of my invention it will be apparent to those skilled in the art that various changes and modifications may be made without departing from the spirit of the invention or the scope of the appended claims.

I claim:

1. In a machine for making line guide holders, the combination of means for intermittently feeding a supply length of wire, means located along the line of feed of the wire for splitting a section of the wire advanced by said feeding means by a longitudinal incision disposed substantially midway between its edges, means along the line of feed of the wire following said splitting means for spreading apart the separated wire portions at such incision including a spreading punch, means for advancing the punch through such incision at right angles to the direction of feed of the wire during a period of dwell in the feed of the wire, means associated with such advancing for drawing said punch in a direction opposite to the direction of feed of the wire during its advancement through such incision so that said punch in its advancing movements simultaneously moves in a direction at right angles to the direction of feed of the wire and in a direction in alignment with, but opposed to such direction of feed so as to exert a longitudinal drawing action on the wire during its spread of the separated portions thereof, and means engageable with a portion of the wire in advance of said punch in the direction of feed of the wire for restricting retracting movement of the wire during the combined advancing and drawing movement of said punch.

2. In a machine for making line guide holders, in combination, means for feeding a supply length of wire in which longitudinal sections thereof are split apart into longitudinally separated paired wire portions, means located along the line of feed of the wire for spreading apart a pair of separated wire portions in a longitudinal section of such supply length of wire advanced by said feeding means, means for advancing said spreading means between the separated wire portions, means associated with said advancing means for drawing said spreading means in a direction opposite to the direction of feed of the wire during its advancement between such separated wire portions so that said means in its advancing movements simultaneously moves in a direction at right angles to the direction of feed of the wire and in a direction in alignment with, but opposed to such direction of feed so as to exert a longitudinal drawing action on the wire during its spread of the separated portions thereof, and means engageable with a section of the wire in advance of said spreading means in the direction of feed of the wire for restricting retracting movement of the wire during the combined advancing and drawing movement of said spreading means.

3. In a machine for making line guide holders, the combination of means for intermittently feeding a supply length of wire, means located along the line of feed of the wire for splitting a section of the wire advanced by said feeding means by a longitudinal incision disposed substantially midway between its edges, means along the line of feed of the wire following said splitting means for spreading apart separated wire portions at a previously formed incision in the wire, and means following said spreading means in the direction of feed of the wire for completing the formation of spread separated wire portions and for cutting a completed holder from the wire, said splitting, spreading, forming and cutting means including a series of punches arranged in aligned relation along the path of feed of the wire, said spreading punch being substantially longer than the remaining punches so that it completes the spreading operation prior to the operations of the remaining punches and is inserted between the wire portions spread thereby to hold the wire during the following operations of said other punches.

4. In a machine for making line guide holders, in combination, means for feeding a supply length of wire, means at a first station located along the line of feed of the wire for splitting a section of the wire by a longitudinal incision disposed substantially midway between its edges, means at a second station following said first station along the line of feed of the wire for spreading apart the separated wire portions at a previously formed incision in the wire, said spreading means being constructed and arranged to spead the wire portions at said previously formed incision in each cycle of the machine prior to the operation of said splitting means on the wire and then to hold the wire against longitudinal movement during such splitting operation, holding means adjacently following said spreading means in the direction of feed of the wire and engageable with the wire to restrict longitudinal movement of the wire during the operation of said spreading means, and means associated with said splitting means for holding the wire during the operation of the latter, said associated holding means engaging the wire subsequent to said advanced holding means and coacting with the latter to hold the wire during the operation of said splitting means.

5. In a machine for making line guide holders, in combination, means for intermittently feeding a supply length of wire, means located along the line of feed of the wire for splitting a section of the wire advanced by said feeding means by a longitudinal incision disposed substantially midway between its edges, means following said splitting means along the line of feed of the wire for spreading apart separated wire portions at a previously formed incision including a spreading punch, a pair of slides, means supporting said slides for sliding movement toward the longitudinal central axis of said spreading punch and away from each other in directions at right angles to the line of feed of the wire, spring means for normally maintaining the inner ends of said slides in substantially abutting relation at the line of feed of the wire so that such abutting ends support the section of the wire containing such previously formed incision during a dwell in the feed of the wire, means for advancing the punch through such previous incision and between said slides to cause the latter to be pushed apart during the spreading operation, said slides holding the wire during such spreading operation and until the punch has advanced sufficient distance to register the shank of said punch in the spread orifice of the wire, said punch being of such length as to complete the spreading operation prior to the operation of said splitting means and to remain in threaded relation with the previously formed incision during the splitting operation on a following section of the wire, and means for holding the wire during the spreading and splitting operations.

6. In a machine for making line guide holders, in combination, means for intermittently feeding a supply length of wire, means located along the line of feed of the wire for splitting a section of the wire advanced by said feeding means by a longitudinal incision disposed substantially midway between its edges, means at a station following said splitting means along the line of feed of the wire for spreading apart separated wire portions at a previously formed incision including a first slide, means supporting said slide for sliding movement in directions parallel to the line of feed of the wire, a spreading punch supported in depending relation on said slide, a pair of slides located below said first slide for supporting the wire part containing said previously formed incision, means supporting said slides for sliding movement toward the longitudinal central axis of said spreading punch and away from each other in directions at right angles to the line of feed of the wire, spring means for normally maintaining the inner wire supporting ends of said slides in substantially abutting relation at the line of feed of the wire, means for advancing said punch down through such incision in the wire part and between said slides against the tensions of the springs thereof, said slides holding the wire during the spreading action of said punch and until the punch has advanced sufficient distance to register the shank of the punch in the spread orifice of the wire, swedging means following said spreading means in the direction of feed of the wire for shaping an unsevered part of the wire in advance of the part of the wire spread by said punch, means located between said punch and said swedging means for forcing said first slide towards said splitting means to cause said punch to draw in a direction opposite to the direction of feed of the wire during its advancement through such incision so that said punch in its advancing movements simultaneously moves in a direction at right angles to the direction of feed of the wire and in a direction in alignment with, but opposed to such direction of feed so as to exert a longitudinal drawing action on the wire during its spread of the separated portions thereof, wire engaging means located between said punch and said swedging means for restricting retracting movement of the wire during the advancing movement of said punch, said splitting, spreading and swedging means being so constructed and arranged that said splitting means come into operation after the spreading operation of said punch to make a longitudinal incision in the wire at a place spaced in back of said spreading punch, and said swedging means come into operation after the spreading operation of said punch to swedge the wire in arrears of such punch, the operations of said splitting and swedging means being carried out while said punch is threaded through the wire and said holding means is maintaining its hold on the wire.

7. In a machine for making guide holders, in combination, means for feeding a supply length of wire, means located along the line of feed of the wire for splitting a section of the wire advanced by said feeding means by a longitudinal incision disposed substantially midway between its edges, means at a station following said splitting means along the line of feed of the wire for spreading apart separated wire portions at a previously formed incision including a punch formed to bend such wire portions into V-shaped oppositely directed members forming a frame of substantially diamond shape connected along one axis to unsevered parts of the wire, swedging means located in following relation to said spreading means along the line of feed of the wire for shaping an unsevered part of the wire between two such frames, and means located in following relation to said swedging means along the line of feed of the wire for bending the centrally located apexes of a frame, said bending means including a pair of spaced slides, means slidably supporting said slides for sliding movement toward and away from each other in directions at right angles to the line of feed of the wire, spring means normally maintaining said slides in retracted positions against stops so that the forward opposed edges thereof are spaced apart a distance such as to support such central apexes of a frame, a bending die coacting with said slides to draw a supported frame into a substantially U-shape, means for advancing said die between said slides, and means associated with said die and engageable with the rear edges of said slides during the advancement of said die to move said slides toward each other sufficiently to bend such central apexes into substantially parallel relation.

References Cited in the file of this patent
UNITED STATES PATENTS

| | | |
|---|---|---|
| 841,679 | Fehr | Jan. 22, 1907 |
| 875,659 | Fehr | Dec. 31, 1907 |
| 1,652,630 | Mogford et al. | Dec. 13, 1927 |
| 1,805,124 | Wilcox | May 12, 1931 |
| 1,948,129 | Ragan | Feb. 20, 1934 |
| 2,041,860 | Ragan | May 26, 1936 |
| 2,146,964 | Legat | Feb. 14, 1939 |
| 2,170,784 | Donovan et al. | Aug. 22, 1939 |
| 2,376,335 | Braendel et al. | May 22, 1945 |